(12) United States Patent
Lippert et al.

(10) Patent No.: US 7,455,204 B2
(45) Date of Patent: Nov. 25, 2008

(54) PORTABLE DESK FOR VEHICLES

(75) Inventors: Charles E Lippert, Grand Rapids, MI (US); Owen A Slater, Minneapolis, MN (US); Kevin G Short, La Grange, IL (US); Peter J Zerillo, Chicago, IL (US); Michael J Joss, Chicago, IL (US)

(73) Assignee: Mobile Office, Inc., Grand Rapids, MI (US)

( * ) Notice: Subject to any disclaimer, the term of this patent is extended or adjusted under 35 U.S.C. 154(b) by 191 days.

(21) Appl. No.: 11/098,155

(22) Filed: Apr. 4, 2005

(65) Prior Publication Data
US 2006/0091169 A1    May 4, 2006

Related U.S. Application Data

(60) Provisional application No. 60/625,017, filed on Nov. 4, 2004.

(51) Int. Cl.
*B60R 7/00* (2006.01)
(52) U.S. Cl. .................. 224/275; 224/42.32; 296/37.15; 297/188.2
(58) Field of Classification Search .................. 224/275, 224/42.32, 499, 539, 400, 929, 282; 296/37.15, 296/24.3, 37.8, 37.14, 37.1; 297/188.2, 135, 297/140, 188.04, 188.05; D12/416, 424, D12/426.1; 312/235.8, 235.2, 290, 328; 108/13, 17, 44, 167, 171
See application file for complete search history.

(56) References Cited

U.S. PATENT DOCUMENTS

| | | | | |
|---|---|---|---|---|
| 3,951,486 A | * | 4/1976 | Tracy | 312/235.8 |
| 4,909,159 A | * | 3/1990 | Gonsoulin | 108/44 |
| D332,527 S | * | 1/1993 | Szablak et al. | D12/426.1 |
| 5,479,866 A | * | 1/1996 | Rae | 108/44 |
| 5,551,616 A | * | 9/1996 | Stitt et al. | 224/275 |
| 5,560,676 A | * | 10/1996 | Griffith et al. | 297/188.2 |

(Continued)

OTHER PUBLICATIONS

"AutoExec and AutoExec Pro Instruction Booklet," published more than one year prior to Nov. 4, 2004.

(Continued)

*Primary Examiner*—Nathan J Newhouse
*Assistant Examiner*—Corey N Skurdal
(74) *Attorney, Agent, or Firm*—Van Dyke, Gardner, Linn & Burkhart, LLP

(57) ABSTRACT

A portable office device is adapted for use with a seat in a vehicle to form a desk and preferably has a main body with a plurality of storage compartments, an angled bottom, and a two-piece, hinged work surface member affixed to the main body that is selectively positionable between an open and closed position. When open the work surface member includes an expanded, co-planar work surface suitable for writing or a laptop computer. The portable office device also includes a receptacle adapted to removably receive either a spacer or a filler member/plug, where the spacer and plug enable the portable office device to be selectively positioned within the vehicle providing a greater range of convenient and comfortable use for users of the device. The ability to selectively position the office device in the vehicle passenger compartment, along with a two piece work surface member and an angled bottom, creates a convenient apparatus for both working on and storing work related items in a vehicle.

12 Claims, 14 Drawing Sheets

U.S. PATENT DOCUMENTS 5,667,272 A * 9/1997 Sutton .................. 297/140
5,973,917 A * 10/1999 White .................. 361/683
6,019,386 A * 2/2000 Morelock ............... 280/507
6,273,310 B1 * 8/2001 Gregory ................ 224/275
6,588,821 B2 * 7/2003 Worrell et al. .......... 296/37.8

OTHER PUBLICATIONS

"AutoExec Pro" advertisement, published more than one year prior to Nov. 4, 2004.

"AutoExec Travel/Carrying Case" advertisement, published more than one year prior to Nov. 4, 2004.

* cited by examiner

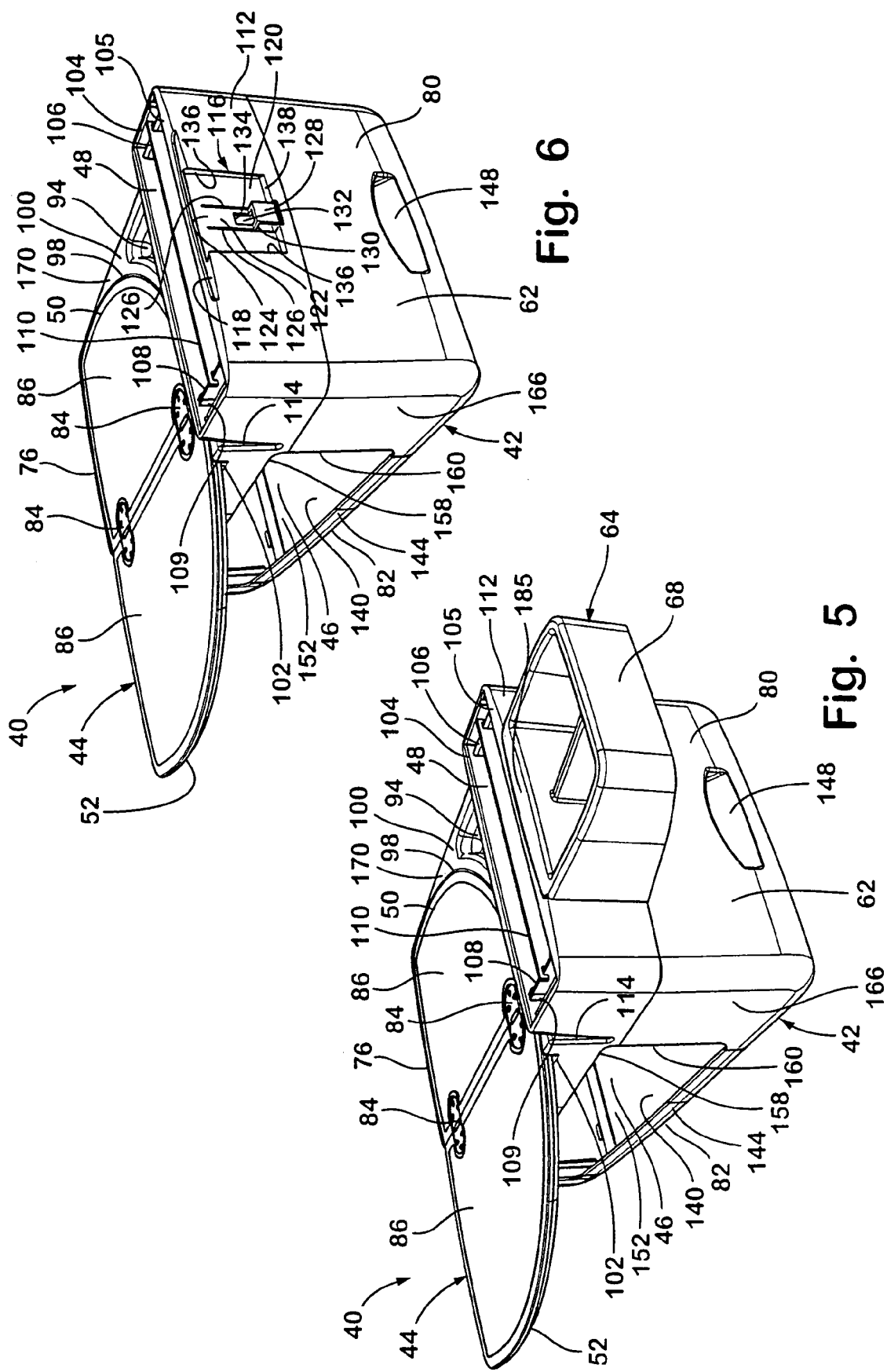

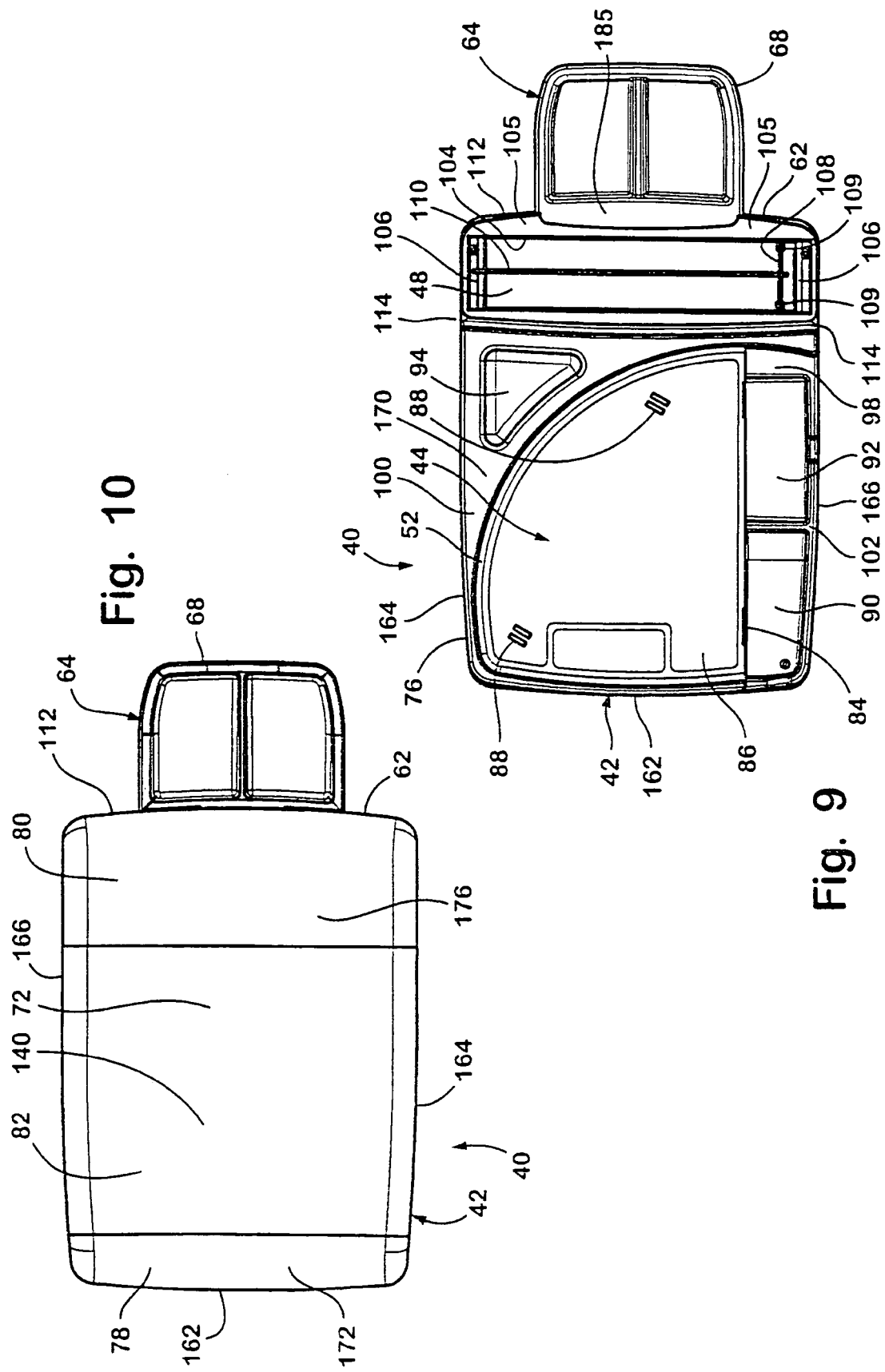

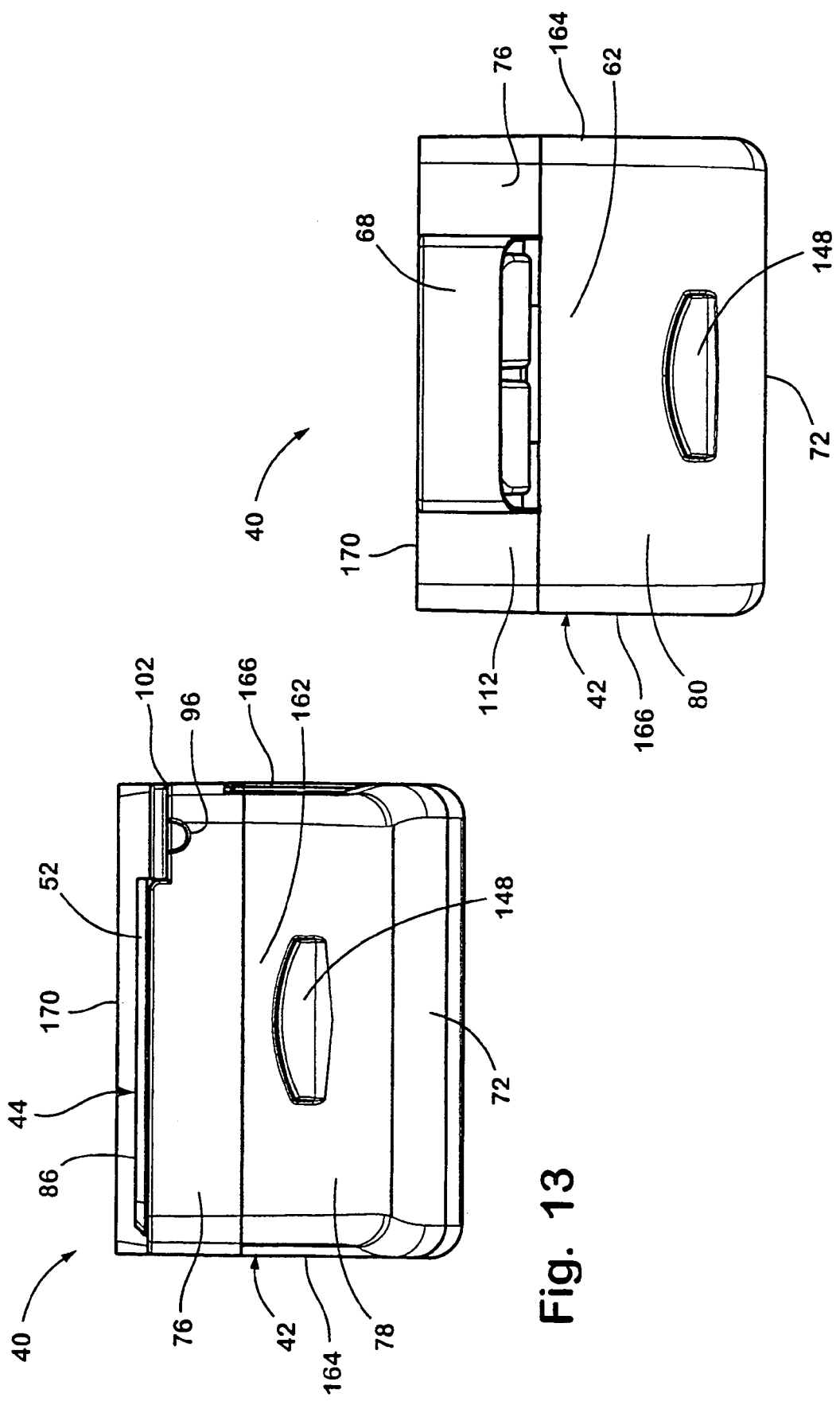

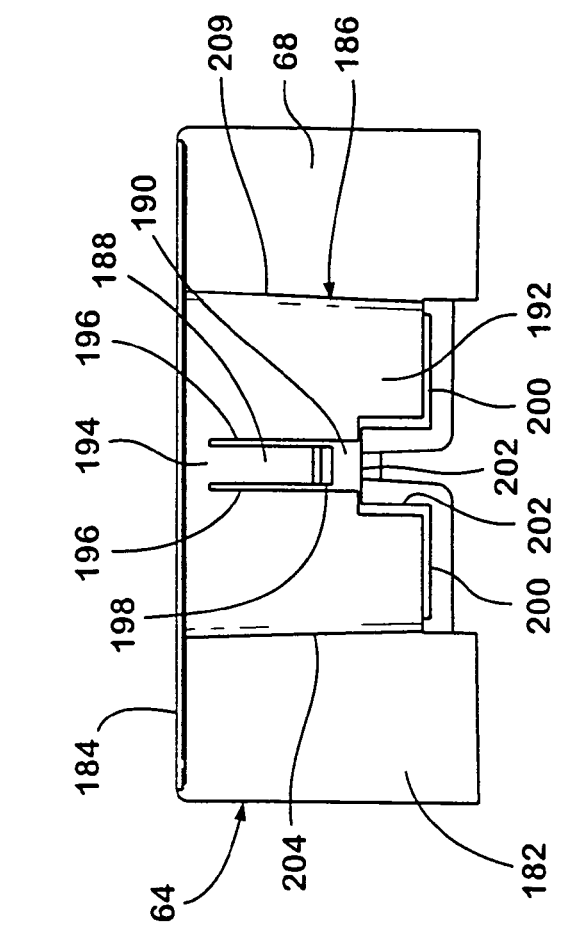
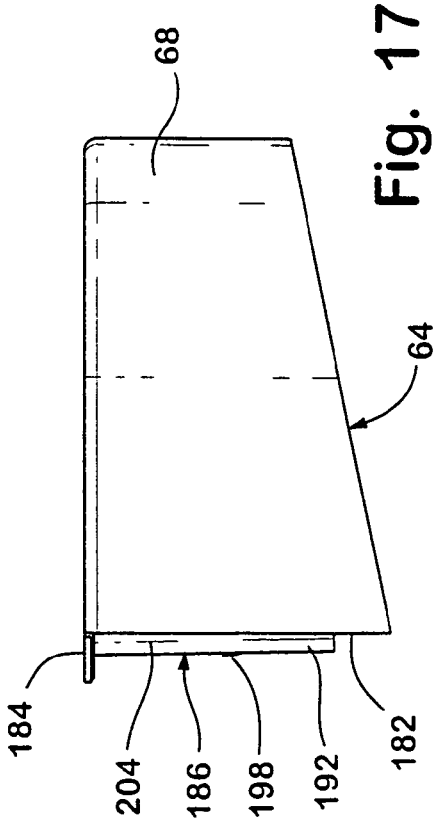

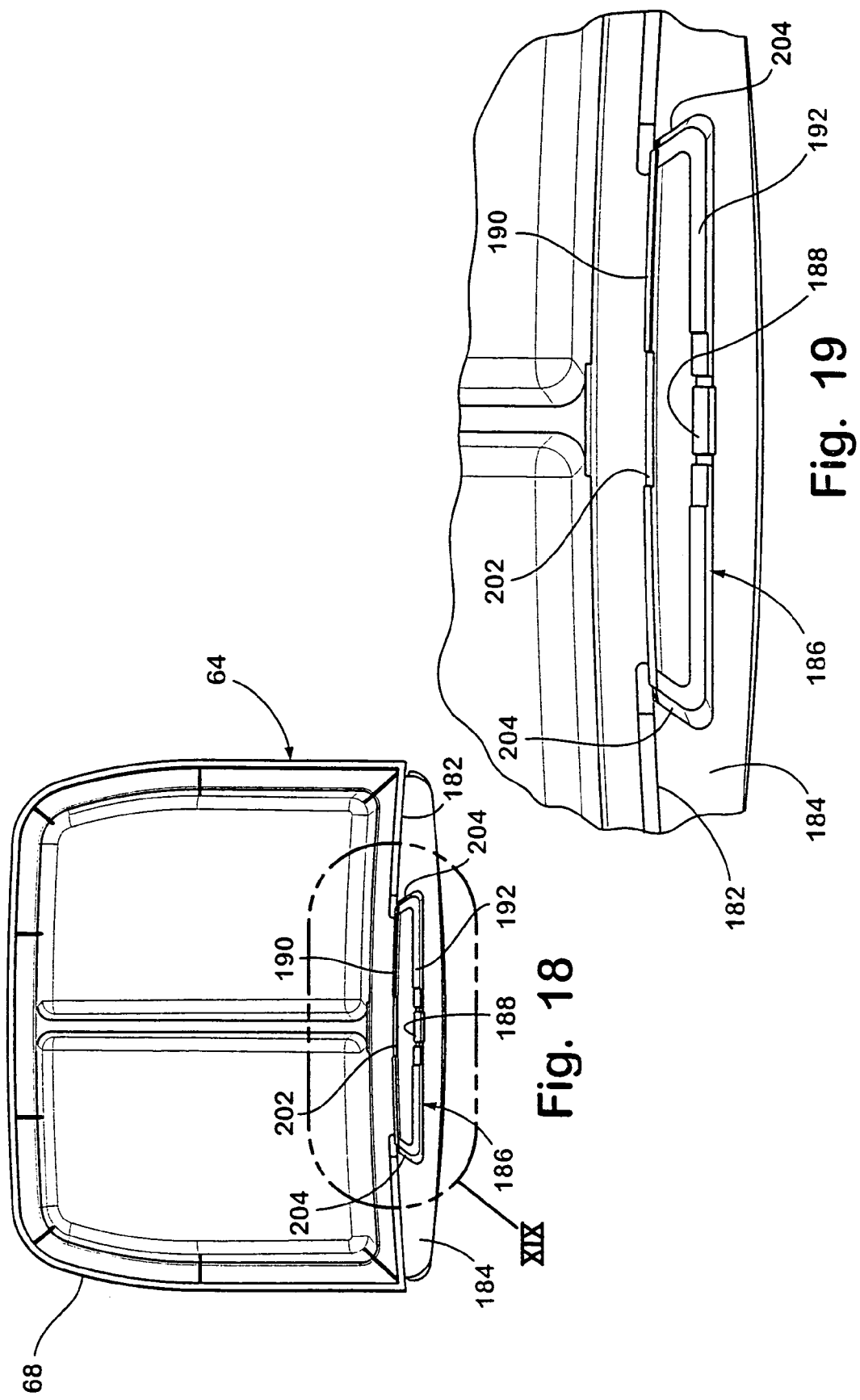

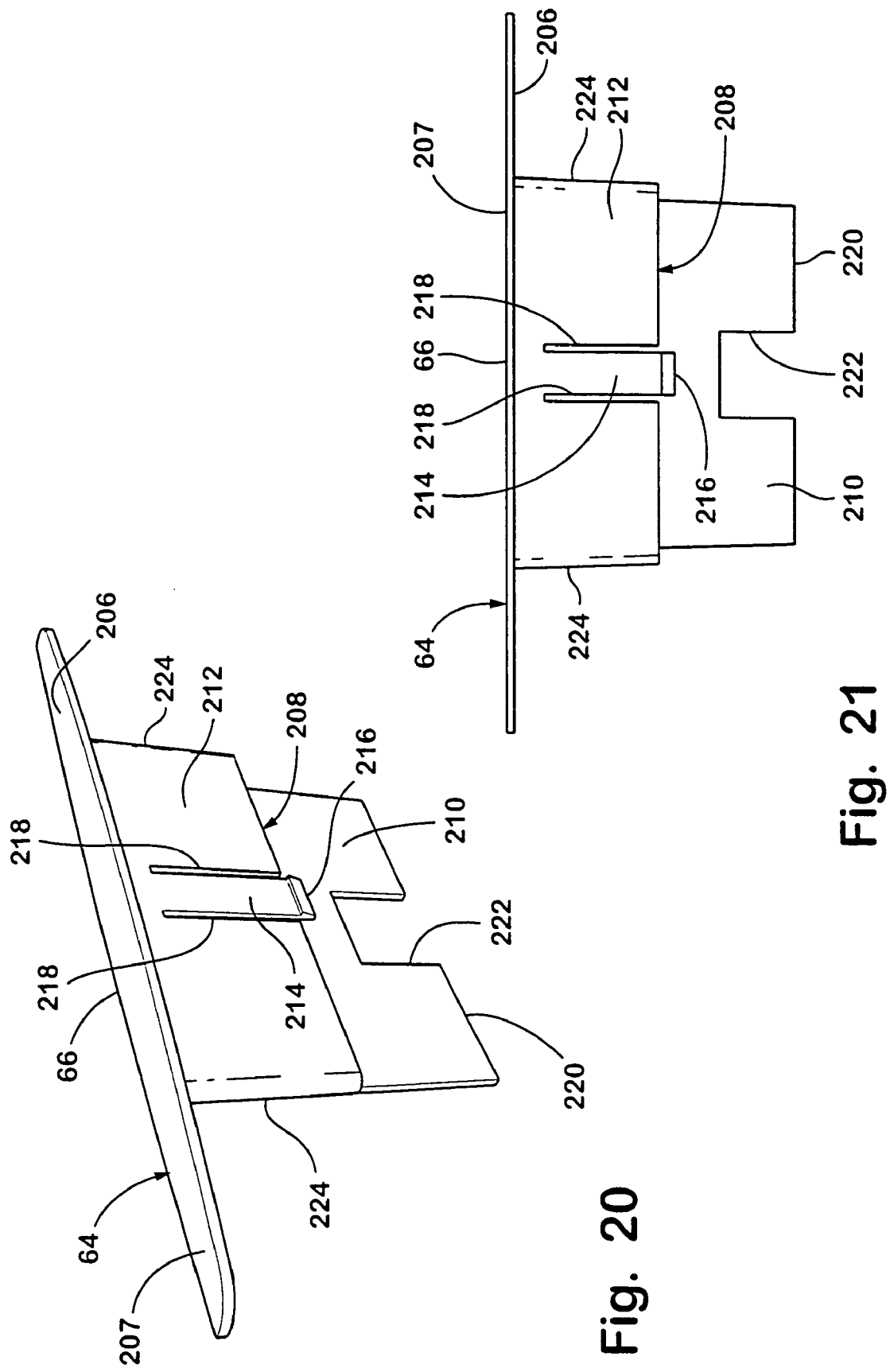

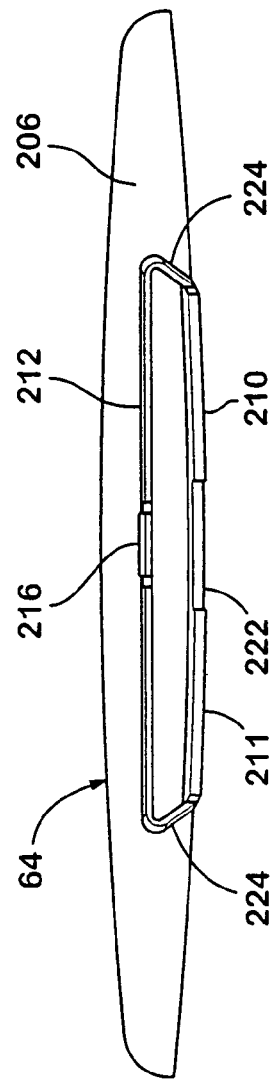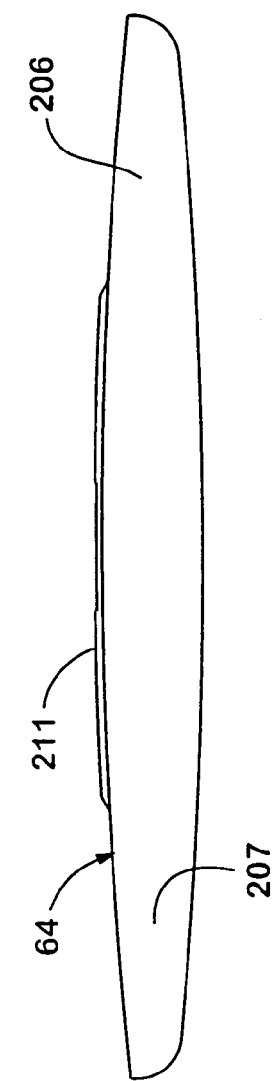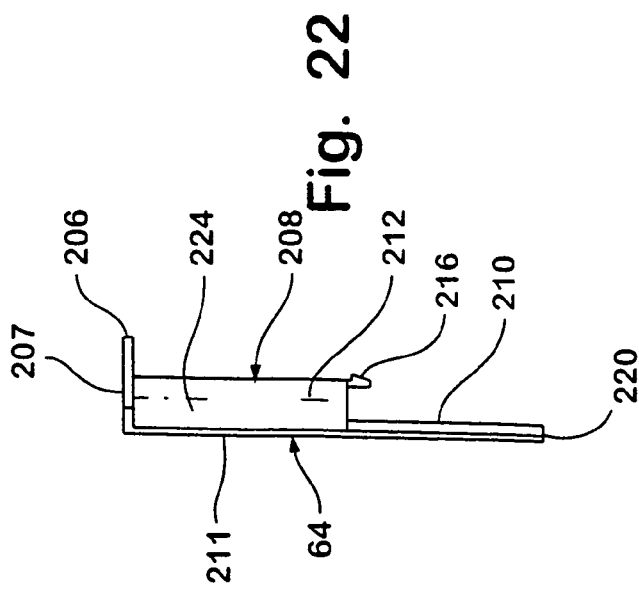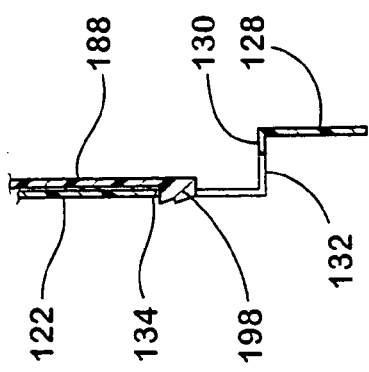
Fig. 22
Fig. 23
Fig. 24
Fig. 25

PORTABLE DESK FOR VEHICLES

CROSS REFERENCE TO RELATED APPLICATION

The present application claims priority of U.S. provisional application Ser. No. 60/625,017, filed Nov. 4, 2004, by Lippert et al. for PORTABLE DESK FOR VEHICLES, which is hereby incorporated herein by reference in its entirety.

BACKGROUND AND TECHNICAL FIELD OF THE INVENTION

The present invention is directed to portable work surfaces, and in particular to a portable desk or office device for use in vehicles as both a storage medium and a portable laptop computer or typing support, and/or writing surface.

People regularly conduct business away from fixed locations such as offices or homes. In such cases, individuals such as salespersons, contractors, and truckers frequently travel using motor vehicles to reach their contacts or destinations.

Along with reaching remote locations, traveling by motor vehicle enables these individuals to transport many of the items they may need to conduct their business, such as cellular phones, PDA's, documents, files, laptop computers, pens, paperclips, and the like. By having such items in their vehicle, business people are better equipped to efficiently and effectively conduct a broad scope of business without having to make multiple trips between the location of their business contacts and fixed office environments.

However, the glove boxes, center consoles, and door pockets of most motor vehicles are ill equipped to contain the wide array of business and office equipment needed by individuals conducting business "on the road." As such, the motor vehicles of these individuals can become cluttered, making it hard to find needed items or even resulting in lost items, thereby reducing the efficiency of business people conducting mobile business. Such equipment is also likely to move about the vehicle passenger compartment when the vehicle is driven, making it even more difficult to find specific items, and searching for items while driving is an unsafe practice that may lead to accidents. Furthermore, in the event of an accident, loose items in the passenger compartment of a vehicle can become dangerous projectiles that may injure the occupants.

Another difficulty with conducting business from a vehicle is that there are inadequate surfaces upon which to write or type. Center consoles are generally narrow and awkwardly positioned and vehicle seats are low and sloped, forcing the individual to lean over and twist him or herself. Furthermore, as laptop computers and the ability to remotely send and receive data have become more commonplace and enabled a greater scope of business to be conducted on the road, the use of such computers and the amount of typing thereon has greatly increased.

Therefore, what is needed is a device to contain and organize business and office items used by individuals transacting business from motor vehicles. Additionally, adequate writing or typing surfaces are needed in the passenger compartment of such vehicles to enable typing and writing to be conducted more efficiently and effectively.

SUMMARY OF THE INVENTION

A portable desk according to an aspect of the present invention is adapted for use with a seat in a vehicle and comprises a main body having a bottom, at least one compartment, and a work surface member affixed to the main body opposite the bottom. The work surface member includes a first surface member and a second surface member, the second surface member being movably mounted to the first surface member such that the second surface member may be positioned in a substantially co-planar orientation to the first surface member.

According to another aspect of the present invention, a portable desk adapted for use with a seat in a vehicle comprises a generally cubical main body having a top, a bottom, a left side, a right side, a front side, and a back side. A receptacle is included on the main body and is adapted to removably receive an insertable component, where the insertable component is either a spacer or a plug for filling the receptacle.

The ability to selectively install either a spacer or a plug enables a user to adjust the position of the portable desk within his or her vehicle because the spacer, when mounted to the main body, contacts the vertical seat back and positions the portable desk forwardly within the vehicle passenger compartment. This is significant in that vehicle passenger compartments vary in size depending upon the type of vehicle. Furthermore, vehicle drivers vary in height and have different preferences for the position of the driver's seat. Therefore, the ability to adjust the position of the portable desk within a vehicle provides a greater range of convenient and comfortable use for users of the desk. In addition, installation of a spacer to the main body of the portable desk expands the storage capacity of the desk when the spacer includes at least one compartment. The portable desk also includes an expandable work surface adapted for use as a writing and/or laptop computer surface. The work surface comprises a second surface member pivotally mounted to a first surface member, where the second surface member may be positioned in a substantially co-planar orientation to the first surface member. The ability to selectively position the portable desk in the vehicle passenger compartment, along with a two piece work surface member and an angled bottom, creates a convenient apparatus for both working on and storing work related items in a vehicle.

BRIEF DESCRIPTION OF THE DRAWINGS

FIG. 5 is a rear perspective view of the portable desk and spacer of FIG. 4;

FIG. 6 is a rear perspective view of the portable desk of FIG. 5 with the spacer removed;

FIG. 9 is a top plan view of the portable desk of FIG. 3;

FIG. 10 is a bottom plan view of the portable desk of FIG. 3;

FIG. 13 is a front elevation of the portable desk of FIG. 3;

FIG. 14 is a back elevation of the portable desk of FIG. 3;

FIG. 15 is a rear perspective view of the spacer shown removed from the portable desk;

FIG. 16 is a back elevation of the spacer of FIG. 15;

FIG. 17 is a left side elevation of the spacer of FIG. 15;

FIG. 18 is a bottom plan view of the spacer of FIG. 15;

FIG. 19 is a close up bottom plan view of the attachment structure of the spacer shown in area A of FIG. 18;

FIG. 20 is a rear perspective view of the plug shown removed from the portable desk;

FIG. 21 is a back elevation of the plug of FIG. 20;

FIG. 22 is a left side elevation of the plug of FIG. 20;

FIG. 23 is a bottom plan view of the plug of FIG. 20;

FIG. 24 is a top plan view of the plug of FIG. 20; and

FIG. 25 is a side sectional view of the lock latch of the spacer of FIG. 17 engaged with the receptacle latch of FIG. 15.

DESCRIPTION OF THE PREFERRED EMBODIMENT

Figure 1:
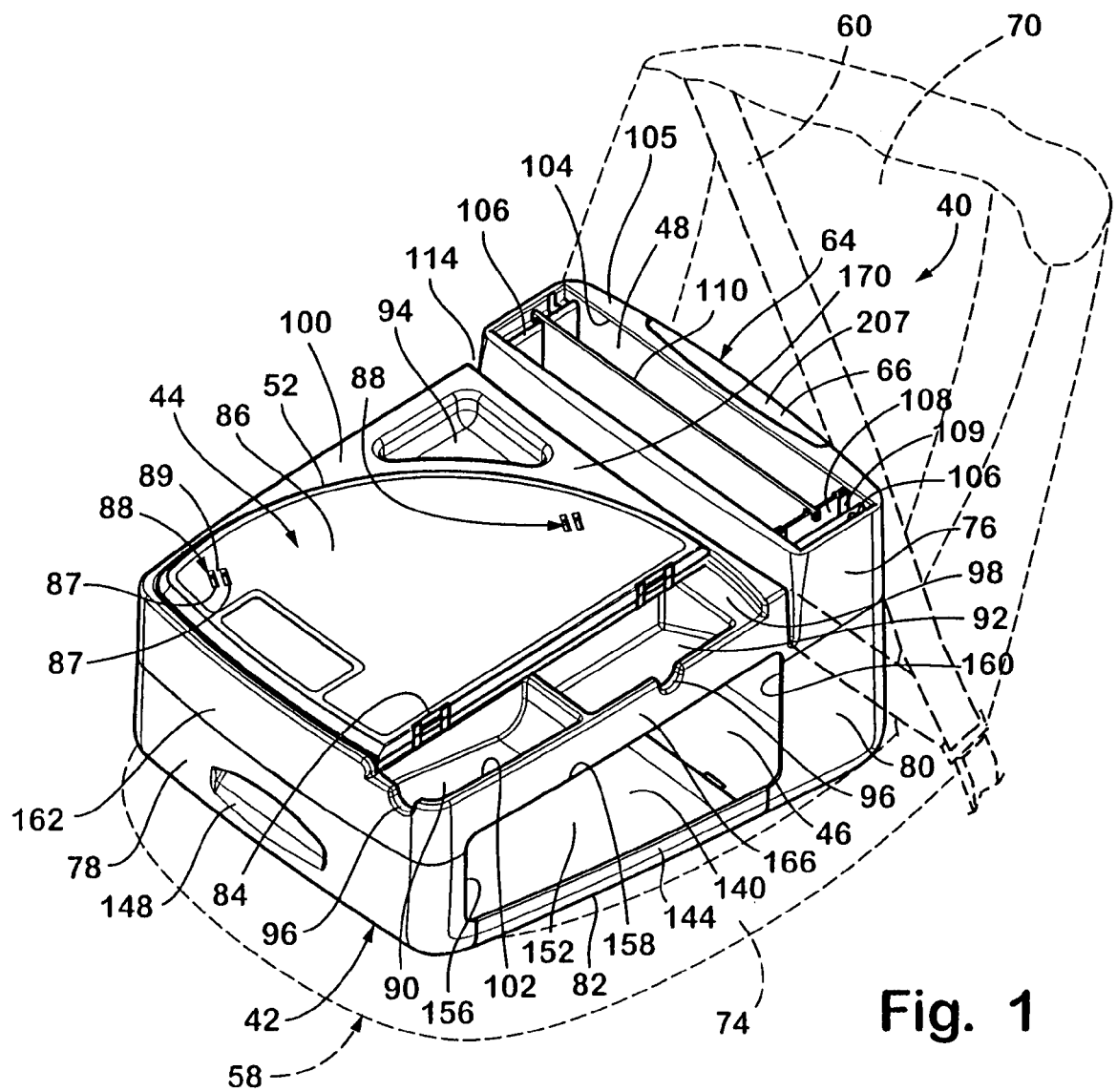
FIG. 1 is a front perspective view of a preferred embodiment of the portable desk of the present invention shown with a plug installed on the backside of the portable desk.

The present invention is embodied in a portable desk or office device. In particular, the preferred embodiment of the present invention is intended to be placed on a seat in a vehicle and thereby provide a convenient work area for individuals conducting business in a mobile setting.

A preferred embodiment of the present invention is shown in the drawings as portable desk 40. Portable desk 40 has a main body 42 that includes a work surface member 44 and a plurality of compartments, such as horizontal compartment 46 and vertical compartment 48. Work surface member 44 comprises first surface member 50 and second surface member 52 that are hingedly connected together for pivotal movement with respect to one another, thereby enabling work surface member 44 to be selectively placed in either a closed position (FIG. 1) or an open position (FIG. 2). When portable desk 40 is installed in a vehicle, extension of second surface member 52 into the open position effectively extends the work surface toward the driver's seat with first and second surface members 50, 52 being in substantially one plane for ease and comfortable use by the vehicle driver.

Figure 2:
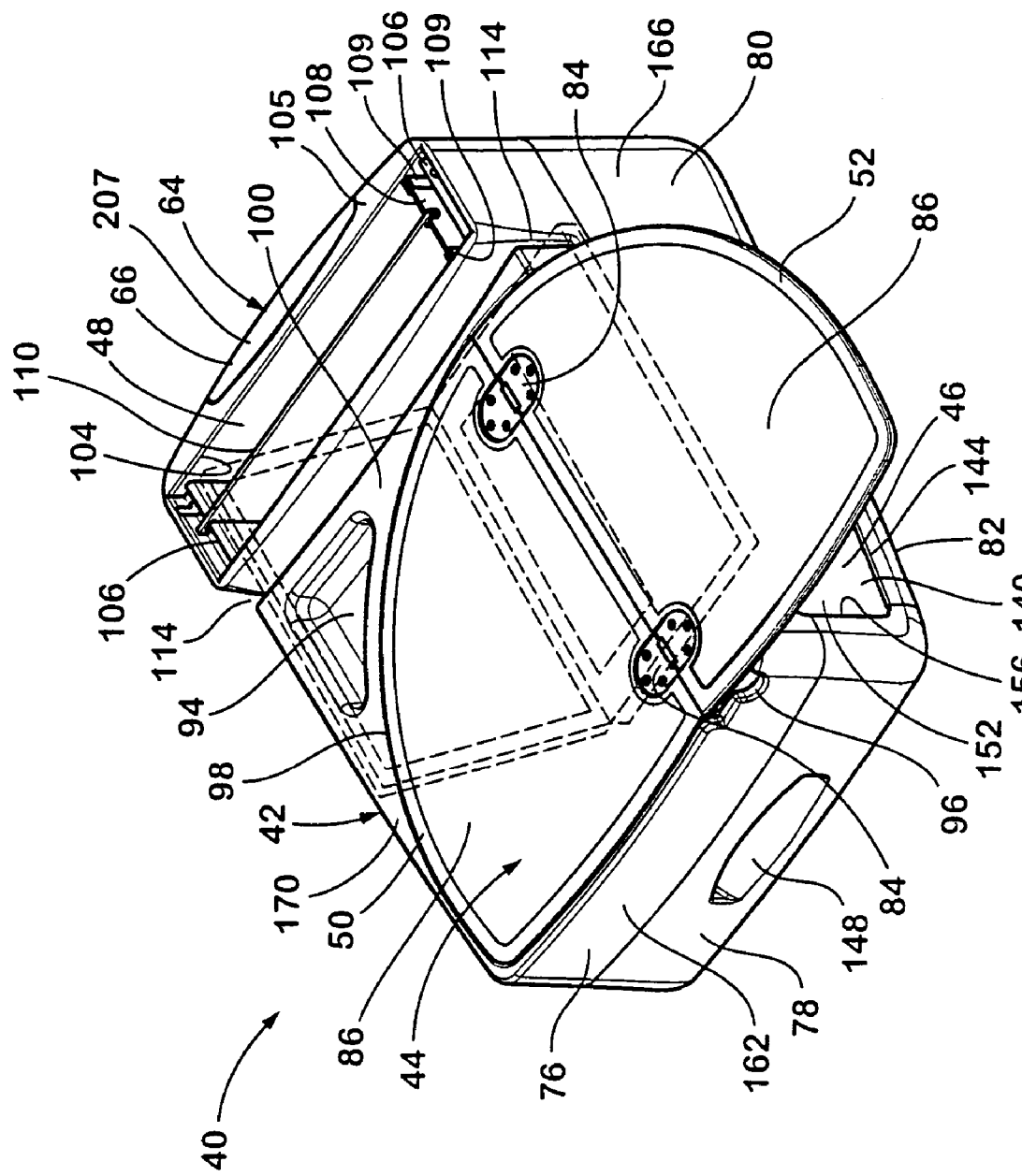
FIG. 2 is a front perspective view of the portable desk of FIG. 1 shown with the work surface member in an open position.
Figure 3:
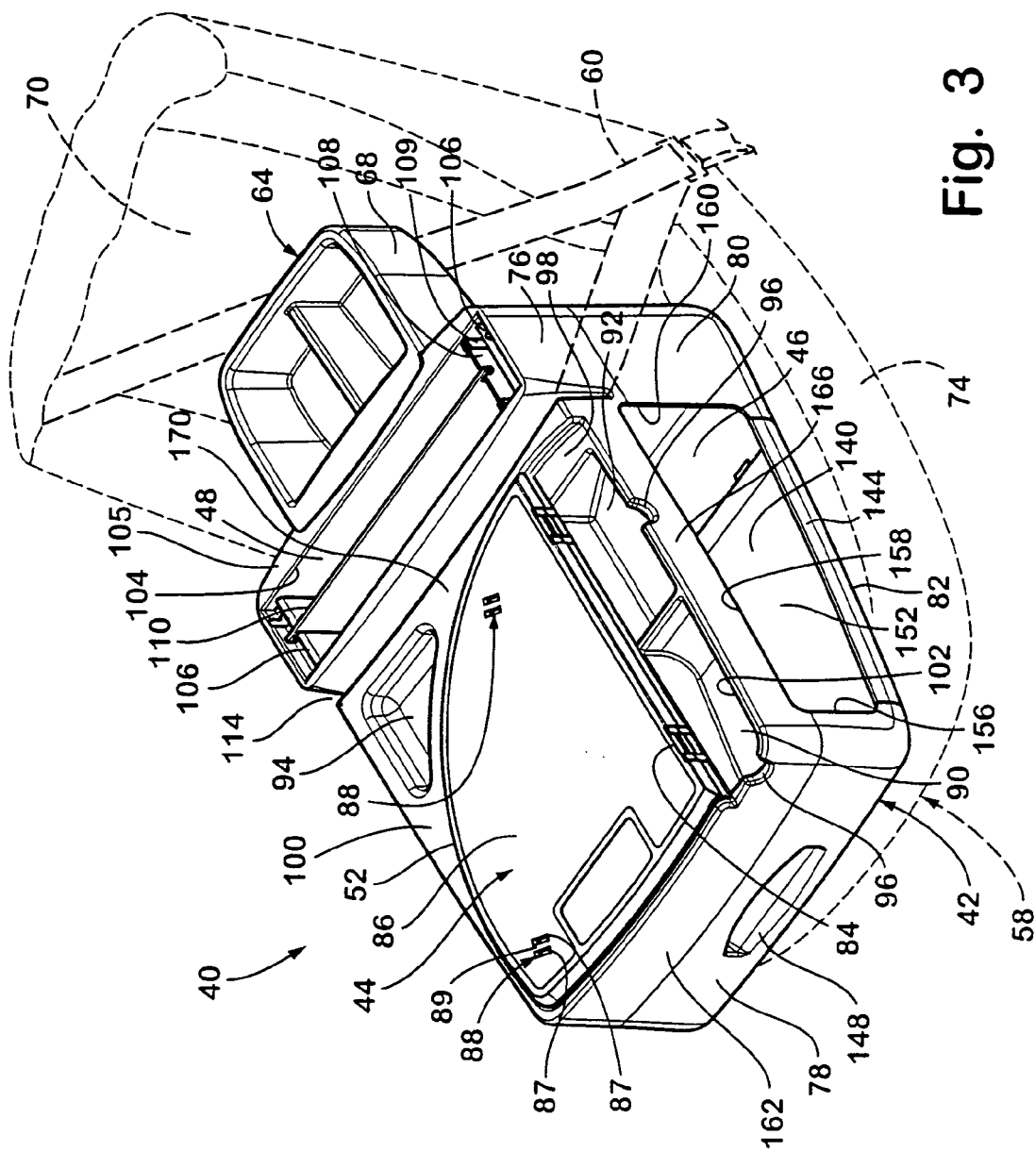
FIG. 3 is a front perspective view of the portable desk of FIG. 1 shown with the plug removed and a spacer installed on the backside of the portable desk.
Figure 4:
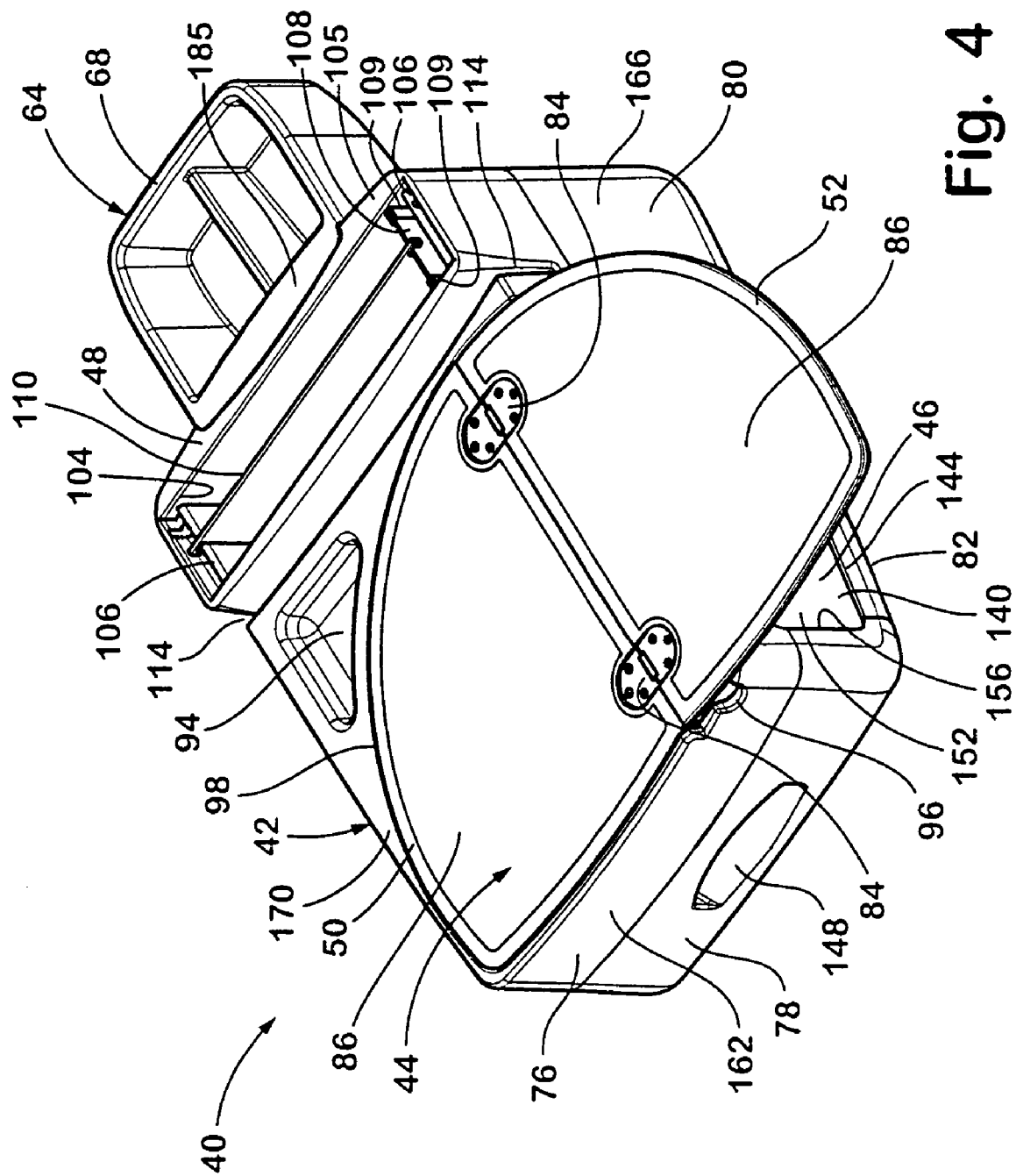
FIG. 4 is a front perspective view of the portable desk of FIG. 3 shown with the work surface member in an open position.
Figure 11:
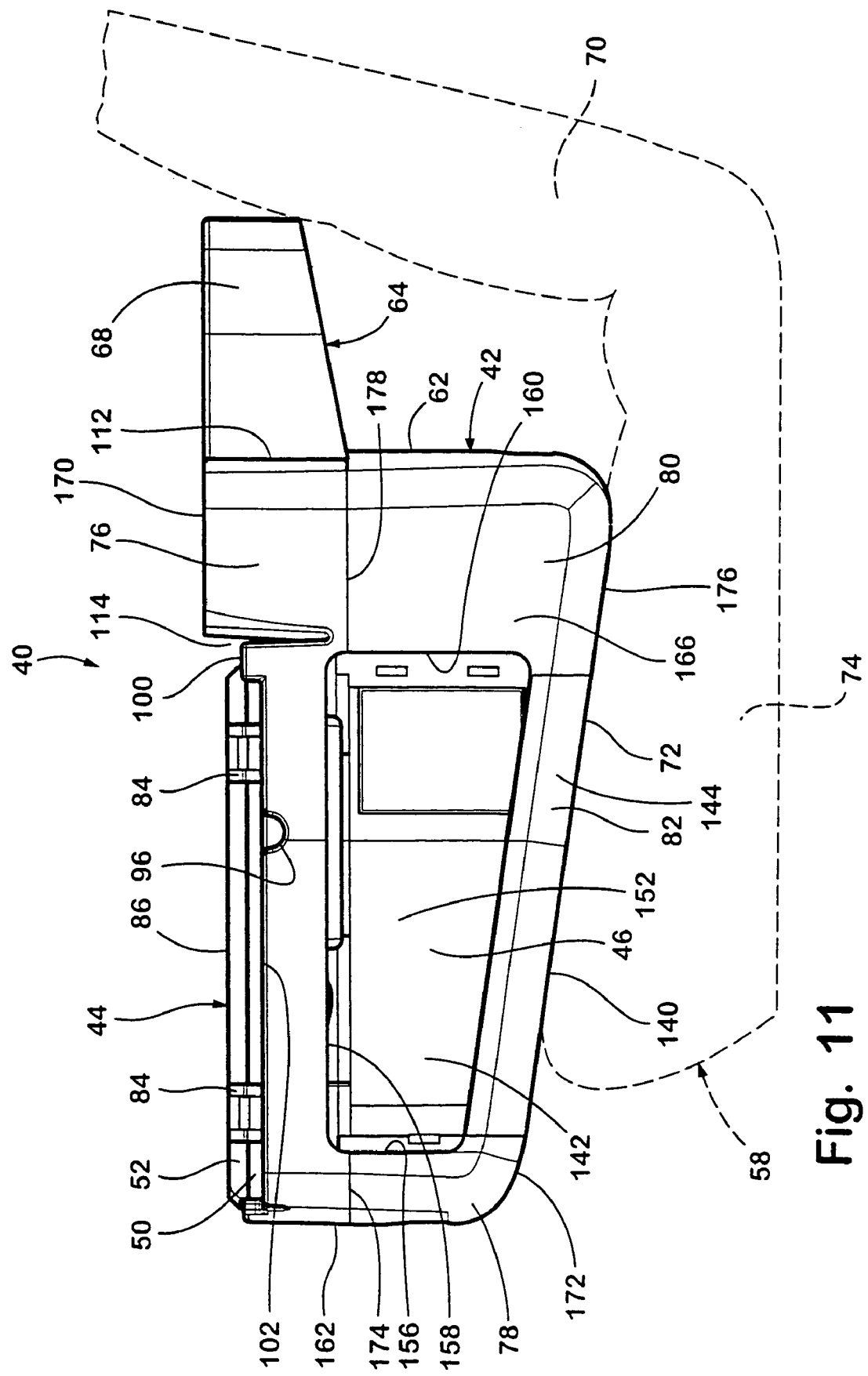
FIG. 11 is a right side elevation of the portable desk of FIG. 3.

As shown in FIG. 1, portable desk 40 is adapted to be secured to the seat 58 of a vehicle by use of a seat belt 60. When installed on a vehicle seat 58 in this manner, portable desk 40 provides a convenient location to store items such as folders, cellular phones, pens, laptop computers, and the like. And when needed for typing or writing, work surface member 44 provides a convenient area upon which to support a laptop computer, writing pad, or the like. The rear or backside 62 of portable desk 40 is adapted to receive an insertable component 64, which in the preferred embodiment is either a filler plug 66 (FIGS. 1 and 2) or a spacer 68 (FIGS. 3 and 4). FIGS. 3 and 11 disclose that when spacer 68 is installed on portable desk 40, spacer 68 contacts seat back 70 such that desk 40 is forwardly positioned within the passenger compartment of the vehicle. However, when plug 66 is installed instead of spacer 68, rear surface 62 contacts seat back 70 (FIG. 1) thereby effectively positioning work surface member 44 more rearwardly. This allows the user to choose the position desired for desk 40 on the vehicle seat or adapt the desk position to the size and length of the seat 58.

Figure 12:
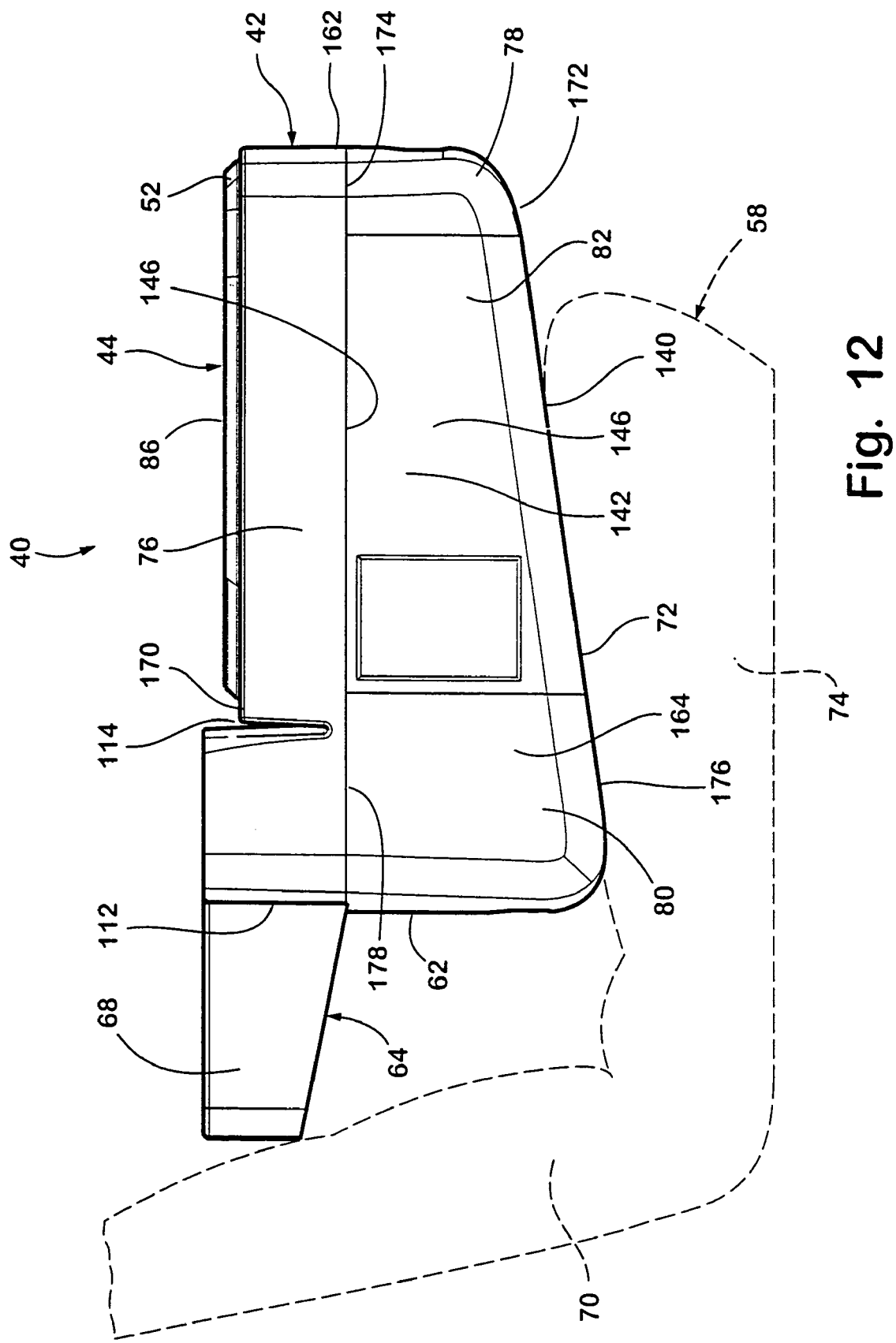
FIG. 12 is a left side elevation of the portable desk of FIG. 3.

In addition, as best understood with reference to FIGS. 1, 11, and 12, portable desk 40 includes a sloped or angled bottom 72, where the slope of bottom 72 generally conforms to the angle of a vehicle seat bottom 74. Therefore, when angled bottom 72 of portable desk 40 is installed on a vehicle seat bottom 74, as in FIGS. 1, 11 and 12, work surface member 44 is kept in a substantially horizontal orientation.

In the preferred embodiment, referring to FIGS. 1-14, main body 42 of portable desk 40 is constructed from upper member 76, front corner member 78, back corner member 80, panel member 82, and work surface member 44, with work surface member 44 being affixed to upper member 76.

As previously noted, work surface member 44 comprises first surface member 50 and second surface member 52, where in the preferred embodiment first and second surface members 50, 52 are hingedly secured to one another by hinges 84. First surface member 50 is secured to upper member 76 such that second surface member 52 may be varied between an open position (FIG. 2) and a closed position (FIG. 1). When second surface member 52 is extended into the open position, second surface member 52 is substantially co-planar with first surface member 50 such that first and second surface members 50, 52 form a generally flat, unitary work area. The co-planar relationship of first and second surface members 50, 52 in the open position provides a larger effective work area. Furthermore, when work surface member 44 is then used to support items such as writing pads, laptop computers, or the like, such items are able to sit flat on work surface member 44 without wobbling or without an unwanted ridge in the middle of the work area.

In the preferred embodiment, first and second surface members 50, 52 are constructed of a polymeric material and a non-slip coating or pad 86 is applied thereto. Non-slip pads 86 are constructed of rubber, or the like, and are secured to first and second surface members 50, 52, as with adhesive. Non-slip pads 86 prevent slipping of a laptop computer or writing pad that is placed on work surface member 44. Notably, non-slip pads 86 are provided on both sides of second surface member 52 as laptop computers, or the like, may be placed on work surface member 44 when second surface member 52 is in either the open or closed position.

As shown in FIG. 1, work surface member 44 may also include securing notches 88. Securing notches 88 are adapted to provide a location for securing straps, hooks, or the like, such that items placed on work surface member 44 can be securely held to work surface member 44. In the preferred embodiment, securing notches 88 are formed as two parallel openings 87 in the surface of work surface member 44 with both openings 87 leading to a single cavity below the surface such that the sliver of work surface member 44 separating the openings 87 forms a bridge or bar 89 above the cavity. Thus, a securing strap may be passed into one of the openings 87, passed under bridge 89, and out of the other opening 87. Although securing notches 88 are only shown on the side of second surface member 52 that is visible in the closed position, securing notches 88 may also be located on the other side of second surface member 52 and/or on first surface member 50.

In the preferred embodiment, upper member 76 is constructed of molded polymeric material. Upper member 76, as best seen in FIGS. 1-4 and 9, includes first compartment 90, second compartment 92, and third compartment 94, all of which may be used as storage locations for pens, paper clips, cellular phones, or the like. First and second compartments 90, 92 have sloped bottoms, with the bottom of first compartment 90 sloping from front-to-back and the bottom of second compartment 92 sloping from side-to-side. First and second compartments 90, 92 also include finger notches 96 that, when second surface member 52 is in the open position, enable a user to insert his or her fingers therein and flip second surface member 52 to the closed position. Finger notches 96 also allow items to slightly protrude from first and second compartments 90, 92 and, when second surface member 52 is in an open position, may enable small items to be inserted into first and second compartments 90, 92.

Upper member 76, in the preferred embodiment, also includes a recess 98 adapted to receive work surface member 44. First surface member 50 is secured within recess 98 such that, referring to FIG. 2, first surface member 50 is generally flush with surface 100 of upper member 76. As shown in FIG. 3, recess 98 extends to edge 102 of upper member 76 such that first and second compartments 90, 92 are located within recess 98 and, as shown in FIG. 2, when second surface member 52 is in the open position, second surface member 52 covers first and second compartments 90, 92 and is also flush with surface 100.

Upper member 76 additionally includes rectangular shaped opening 104 within upper surface 105. When the various components of main body 42 are assembled together opening 104 forms vertical compartment 48 in main body 42. In the preferred embodiment, vertical compartment 48 of portable desk 40 is adapted to receive either A4 sized documents, 8½"×11" documents, or hanging files or file folders of such sizes. As best understood with reference to FIGS. 4, 5, and 9, portable desk 40 includes hangars 106 that may be used to hang standard A4 hanging file folders. Alternatively, as shown, insert 108 may be selectively and removably installed into vertical compartment 48 such that compartment 48 is able to receive standard 8½"×11" hanging file folders 110. Insert 108 is slidably installed in a vertical direction between spaced, vertically positioned, parallel, aligned U-shaped flanges 109 that are secured to opposed vertical walls of compartment 48 at positions spaced from the end of the compartment toward the opposite compartment end. U-flanges 109 open toward one another as shown in FIGS. 1-6 and 9. As shown in FIG. 9, upper member 76 also includes curved back 112.

With reference to FIGS. 1, 5 and 9, upper member 76 also includes slot 114 that is adapted to receive the lap belt portion of a vehicle seat belt 60 (as shown in FIG. 1). Slot 114 thereby enables portable desk 40 to be securely held on vehicle seat 58 when the vehicle is in motion. FIG. 1 discloses portable desk 40 secured to vehicle seat 58 when plug 66 is installed, and FIG. 3 discloses portable desk 40 secured to vehicle seat 58 when spacer 68 is installed.

Figure 7:
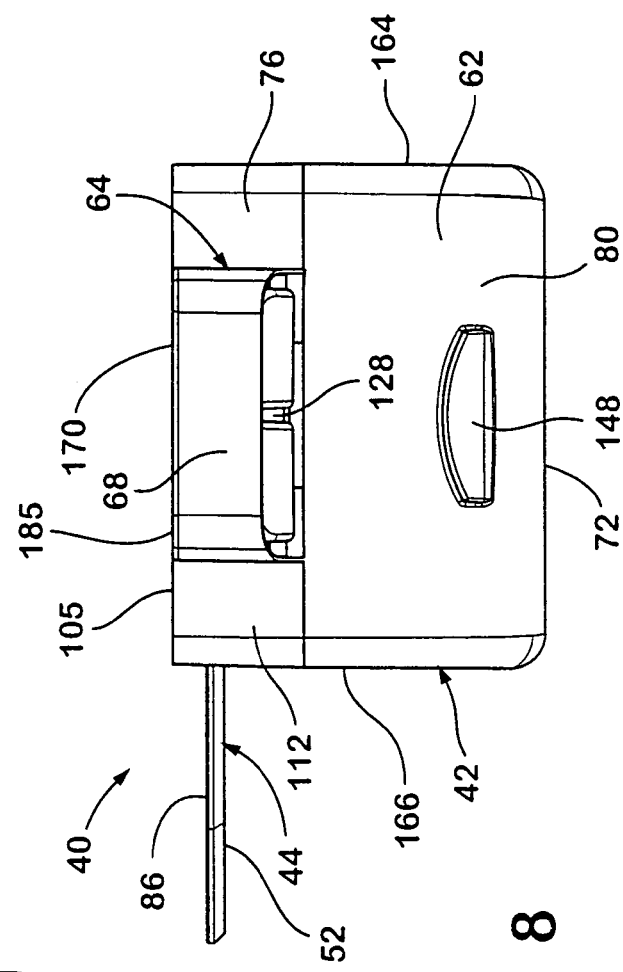
FIG. 7 is a rear elevation of the portable desk of FIG. 6.
Figure 8:
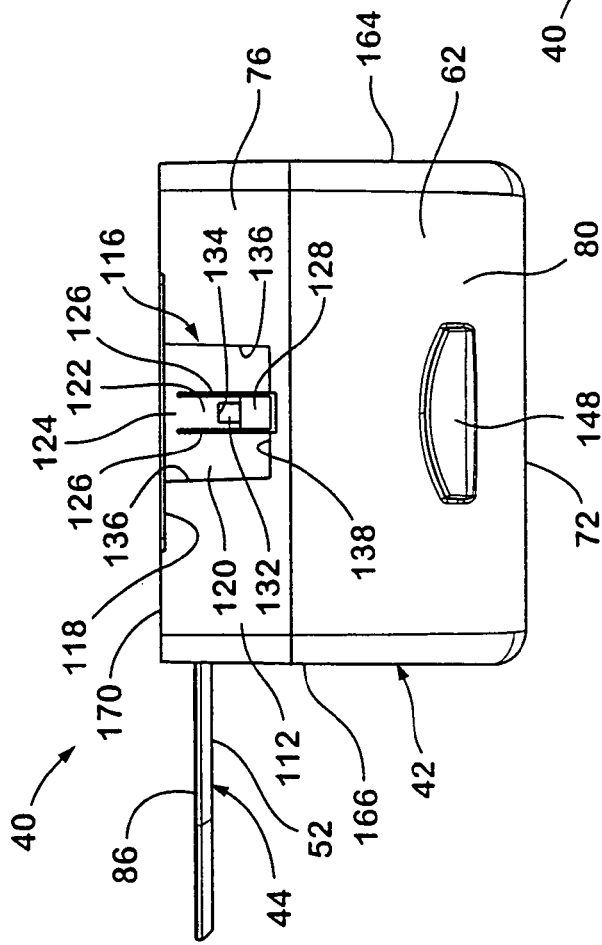
FIG. 8 is a rear elevation of the portable desk of FIG. 5.

As shown in FIGS. 6 and 7, upper member 76 also includes receptacle 116, where receptacle 116 is configured to selectively and removably receive spacer 68 or filler plug 66, as described below. Receptacle 116 includes an upper indent or recess 118 and a vertical indent 120 with a flexible latch 122 located within vertical indent 120. Latch 122 is affixed to upper member 76 within vertical indent 120 at an upper region 124 and separated from vertical indent 120 by slots 126, thereby providing latch 122 with a flexible, spring-like characteristic. Release tab 128 is located at the end of latch 122, with release tab 128 being affixed to latch 122 by extension member 130, where extension member 130 forms an approximate right angle with both latch 122 and release tab 128 such that latch 122 and release tab 128 are generally parallel, but located in separate planes (see FIG. 25). Angulated lock hole 132 is located on both latch 122 and extension member 130 and forms a catch edge 134 at the upper end of the portion of lock hole 132 located on latch 122. As best understood with reference to FIG. 6, vertical indent 120 is offset from curved back 112 of upper member 76 by angled grooves 136 that, as described below, assist in retaining spacer 68 or plug 66. Vertical indent 120 also includes support surface 138 positioned at the bottom of receptacle 116.

As noted above, portable desk 40 also includes bottom panel member 82, which in the preferred embodiment is constructed of a light gage steel. Panel member 82 has a first bottom panel section 140 and a second side panel section 142 (see FIG. 12), where second side panel section 142 is positioned, as by bending, at an approximate right angle relative to first bottom panel section 140. Panel member 82 also includes side lip 144 extending from first panel section 140 opposite second side panel section 142, where lip 144 is positioned, also as by bending, at an approximate right angle relative to first bottom panel section 140 (see FIG. 12). Notably, however, as best seen in FIGS. 11 and 12, first bottom panel section 140 is formed relative to second side panel section 142 and lip 144 such that first panel section 140 is angled relative to the straight upper edge 146 of second panel section 142. The angled nature of first panel section 140, as described in more detail below, contributes to the angled bottom 72 of portable desk 40.

Portable desk 40, also as noted above, includes front corner member 78 and back corner member 80, where in the preferred embodiment front and back corner members 78, 80 are constructed of molded polymeric material. Front and back corner members 78, 80 each include a recessed handle area 148 that, when portable desk 40 is assembled in the manner described below, provide a user with a convenient means to insert his or her fingers and grasp and lift portable desk 40.

Upper member 76, front and back corner members 78, 80, and panel member 82 are adapted to be assembled together to form main body 42 of portable desk 40. Front and back corner members 78, 80 are assembled to opposite sides of panel member 82, and upper member 76 is then assembled thereto. The various components of main body 42 may be secured together with adhesive, or may be constructed to include snap fit joints, or secured by other such methods. When upper member 76, front and back corner members 78, 80, and panel member 82 are assembled in this fashion, horizontal compartment 46 is formed in the hollow interior of main body 42, where horizontal compartment 46 is accessed through hole 152. Hole 152 being defined, as shown in FIGS. 1, 3, and 11, by lip 144, front corner member edge 156, upper member edge 158, and back corner member edge 160. Horizontal compartment 46 of portable desk 40 is well adapted to store larger items, such as laptop computers and writing pads.

The assembled main body 42 of portable desk 40 forms a generally trapezoidal cube, having front side 162, backside 62, left side 164, right side 166, bottom 72, and top 170. Notably, because upper member 76, front and back corner members 78, 80, and panel member 82 all contain surfaces that lie in more than one plane, the front side 162, backside 62, left side 164, right side 166, and bottom 72 of portable desk 40 are each defined by more than one component of main body 42. As shown in FIG. 9, top 170 is defined by upper member 76; FIG. 10 discloses that bottom 72 is defined by panel member 82 and front and back corner members 78, 80; FIG. 11 discloses that right side 166 is defined by upper member 76, panel member 82, and front and back corner members 78, 80; FIG. 12 discloses that left side 164 is defined by upper member 76, panel member 82, and front and back corner members 78, 80; FIG. 13 discloses that front side 162 is defined by upper member 76 and front corner member 78, and; FIG. 14 discloses that backside 62 is defined by upper member 76 and back corner member 80.

As previously noted, and best seen from FIGS. 1, 11, and 12, bottom 72 of main body 42 is sloped or angled from front side 162 to backside 62. The angled bottom 72 of main body 42 is formed by the relation of front and back corner members 78, 80 and panel member 82 to upper member 76. FIGS. 11 and 12 also disclose that front corner member 78 includes a lower surface 172 that is angled relative to upper straight edge 174 of front corner member 78. Similarly, back corner member 80 includes a lower surface 176 that is angled relative to upper straight edge 178 of back corner member 80. When assembled, lower surfaces 172, 176 of front and back corner members 78, 80 align with the angle of first panel section 140 of panel member 82 and upper straight edges 174, 178 of front and back corner members 78, 80 align with upper edge 146 of second panel section 142.

The angled bottom 72 of main body 42 is adapted to generally correspond to the slope of vehicle seat bottoms 74. Therefore, as best understood with reference to FIG. 11, when angled bottom 72 is placed on a vehicle seat bottom 74, top 170 remains generally horizontal. Maintaining top 170 in a generally horizontal position is significant in that a user of portable desk 40 may more comfortably type or write on work surface member 44 and items placed thereon are less likely to slide off. Additionally, items stored in first, second, or third compartments 90, 92, 94 of upper member 76 are less likely to fall out.

As previously noted, spacer 68 and filler plug 66 are adapted to be selectively/alternatively and removably installed in receptacle 116 of upper member 76. In the preferred embodiment, spacer 68 is molded from polymeric material and, with reference to FIGS. 15-19, includes two compartments 180, curved surface 182, mounting ledge 184, and attachment structure 186.

Attachment structure 186 of spacer 68 includes lock latch 188, support member 190, and mating member 192. Lock latch 188 is secured to mating member 192 at its upper end 194 and is separated from mating member 192 by slots 196, thereby imparting a flexible, spring-like characteristic to lock latch 188. Lock latch 188 also includes hooked end 198. Support member 190 includes support end 200 and is positioned behind mating member 192. As shown in FIG. 16, support member 190 extends downwardly further than mating member 192 as viewed from the end of spacer 68. Support member 190 additionally includes tab access notch 202, which forms a generally rectangular opening along support end 200. Mating member 192, as best seen in FIGS. 18 and 19, includes inwardly angled sides 204 and forms a generally hollow structure that is, as described below, slid into mating receptacle 116.

Filler plug 66, in the preferred embodiment, is also molded from polymeric material and, with reference to FIGS. 20-24, includes mounting ledge 206 and attachment structure 208. Mounting ledge 206 includes upper surface 207 and support member 210 includes outer surface 211. Attachment structure 208 of plug 66, which is similar in construction to attachment structure 186 of spacer 68, includes support member 210, mating member 212, and lock latch 214. Lock latch 214 includes hooked end 216 and is separated from mating member 212 by slots 218, thereby allowing it to flex. Support member 210 includes support end 220 and tab access notch 222. Finally, mating member 212, as shown in FIG. 23, includes angled sides 224 and forms a generally hollow structure that is matingly received by receptacle 116 in the manner described below.

Spacer 68 and plug 66 are both assembled to and removed from main body 42 in like manner due to their similar construction. Referring to spacer 68, installation is accomplished by sliding attachment structure 186 from above into vertical indent 120 of receptacle 116 such that angled sides 204 of mating member 192 align with angled grooves 136 of receptacle 116. Spacer 68 is then lowered such that hooked end 198 of lock latch 188 passes into angulated hole 132 of latch 122. When spacer 68 is fully seated within receptacle 116, mounting ledge 184 is contained within upper recess 118 and support end 200 of support member 190 rests on support surface 138 of vertical indent 120. In this position, upper surface 185 of mounting ledge 184 is flush with surface 105 of upper member 76 (FIGS. 3 and 4). Inadvertent removal of spacer 68 from receptacle 116 is prevented by engagement of hooked end 198 with catch edge 134 on latch 122 (see FIG. 25), and engagement of angled sides 204 of mating member 192 with angled grooves 136 of vertical indent 120. When so installed, release tab 128 is positioned at the opening of tab access notch 202 such that removal of spacer 68 is accomplished by pushing release tab 128 from below spacer 68 (see FIG. 8), so that hooked end 198 clears catch edge 134, while simultaneously lifting spacer 68 upwards.

Similarly, filler member or plug 66 is installed on main body 42 by sliding attachment structure 208 into vertical indent 120 of receptacle 116, with angled sides 224 of mating member 212 aligning with angled grooves 136 of receptacle 116. Plug 66 is then lowered such that hooked end 216 of lock latch 124 passes into angulated hole 132 of latch 122. When plug 66 is fully seated within receptacle 116, mounting ledge 206 is contained within upper recess 118 and support end 220 of support member 210 rests on support surface 138 of vertical indent 120. In this position, upper surface 207 of mounting ledge 206 is flush with surface 105 of upper member 76 (FIGS. 1 and 2) and outer surface 211 of support member 210 is flush with curved back 112.

As above, inadvertent removal of plug 66 from receptacle 116 is prevented by engagement of hooked end 216 with catch edge 134 on latch 122, and by engagement of angled sides 224 of mating member 212 with angled grooves 136 of vertical indent 120. When so installed, release tab 128 is positioned at the opening of tab access notch 222 such that removal of plug 66 is accomplished by pushing release tab 128 while simultaneously lifting plug 66 upwards.

The ability to selectively and alternatively install either spacer 68 or plug 66 on main body 42 enables a user to expand portable desk 40 to store more items using the compartments 180 of spacer 68. Furthermore, selective installation of spacer 68 or plug 66 allows a user to adjust the position of portable desk 40 within his or her vehicle. As noted above, when spacer 68 is mounted to main body 42, spacer 68 contacts the vertical seat back 70 and positions portable desk 40 forwardly within the vehicle passenger compartment. This is significant in that vehicle seats and vehicle passenger compartments vary in size depending upon the type of vehicle. Furthermore, vehicle drivers vary in height and have different preferences for the position of the driver's seat. Therefore, the ability to adjust the position of portable desk 40 within a vehicle provides a greater range of convenient and comfortable use for users of desk 40.

For people conducting work from their vehicles, the ability to selectively position portable desk 40, along with the two-piece work surface member 44 and angled bottom 72, provide a convenient apparatus for both working on and storing work related items in a vehicle.

The above is a description of the preferred embodiments. One skilled in the art will recognize that changes and modifications may be made without departing from the spirit of the disclosed invention, the scope of which is to be determined by the claims which follow and the breadth of interpretation that the law allows.

The invention claimed is:

1. A portable desk adapted for use with a seat within the interior of a vehicle, said portable desk comprising:
   a main body, said main body including a bottom, at least one compartment, a front surface, a rear surface, and opposed sides, at least one of said sides being adjacent the position of a person in the vehicle in a seat adjacent said one side of said main body when said portable desk is supported on the seat of the vehicle with said rear surface against or adjacent the back of the vehicle seat, and a receiver for receiving a securing member from the vehicle for securing said portable desk to the vehicle seat with said rear surface against or adjacent the back of the vehicle seat; and
   a work surface member, said work surface member being affixed to said main body opposite said bottom;
   wherein said work surface member includes a first surface member having a first work surface thereon and a second surface member having a second work surface thereon, said second surface member being pivotally connected to said first surface member such that said second surface member is selectively positionable between an open position and a closed position, said second work surface being substantially co-planar with said first work surface with a first portion of said second surface member extending outwardly beyond said one side of said main body toward the position of the person in the seat adjacent said one side of said main body when said second surface member is in said open position and said portable desk is supported on a seat of the vehicle with said rear surface against or adjacent the seat back whereby said second work surface is accessible for use by the person in the seat adjacent said one side of said portable desk, and wherein said main body includes an edge at least partially defining a recess adjacent said first surface member, said recess receiving a second portion of said second surface member in said open position with said second portion of said second surface member being supported by said edge of said main body such that said first portion of said second surface member projects beyond said edge, said recess, and said one side of said main body;
   said recess including said at least one compartment, said at least one compartment being covered by said second surface member when said second surface member is in said open position, and wherein said at least one compartment is not covered by said second surface member when said second surface member is in said closed position.

2. The portable desk of claim 1, wherein said bottom is angled relative to said work surface member.

3. The portable desk of claim 1, wherein said receiver on said main body includes a slot adapted to receive a lap belt from the seat of the vehicle.

4. The portable desk of claim 1, further including a horizontal compartment, said horizontal compartment being positioned between said bottom and said work surface member.

5. The portable desk device of claim 1, further including a vertical compartment.

6. The portable desk of claim 1, wherein said front surface and said rear surface each include a handle.

7. The portable desk of claim 1, wherein said work surface member includes a non-slip surface.

8. The portable desk of claim 1, further including an insertable component, and wherein said main body includes a receptacle, wherein said receptacle is adapted to receive said insertable component.

9. The portable desk of claim 8, wherein said receptacle is at said rear surface of said main body, and said insertable component is selected from a spacer member adapted to space said rear surface of said main body away from the back of the vehicle seat and a filler member adapted to close said receptacle.

10. The portable desk of claim 1, wherein said main body is constructed from an upper member, a front corner member, a back corner member, and a panel member.

11. The portable desk of claim 1, wherein said compartment is positioned adjacent the position at which said first and second surface members are pivotally connected and beneath said second surface member such that said compartment is closed by said second surface member when said second surface member is positioned in said open position.

12. The portable desk of claim 9 wherein said spacer member includes a storage compartment therein.

* * * * *